F. J. ASHWELL.
GRAIN WEIGHER.
APPLICATION FILED MAR. 26, 1921.
1,409,642.
Patented Mar. 14, 1922.
2 SHEETS—SHEET 1.
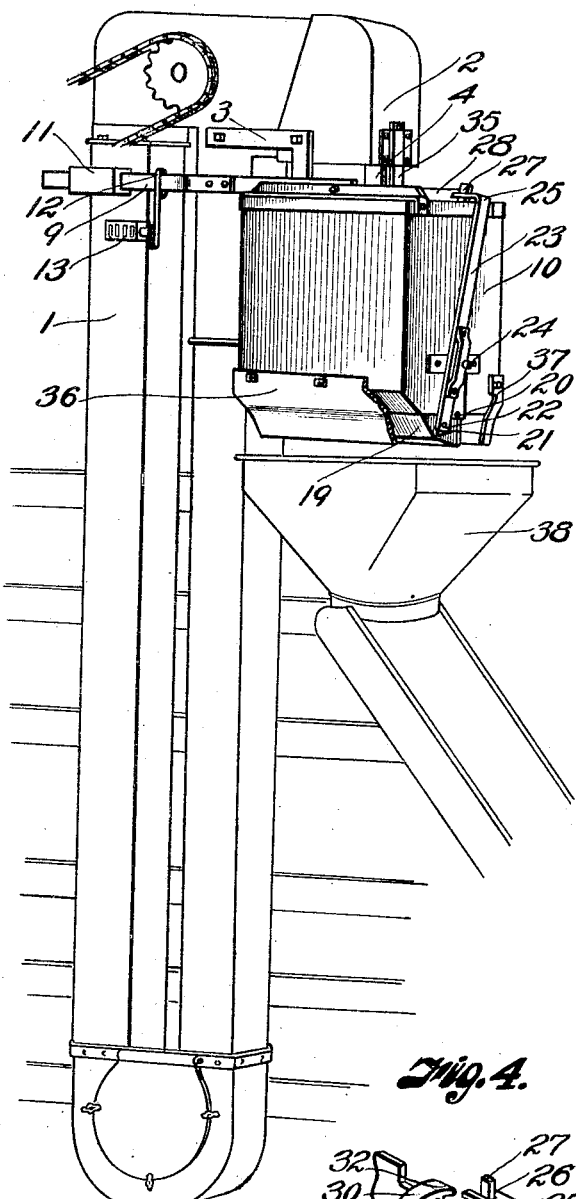
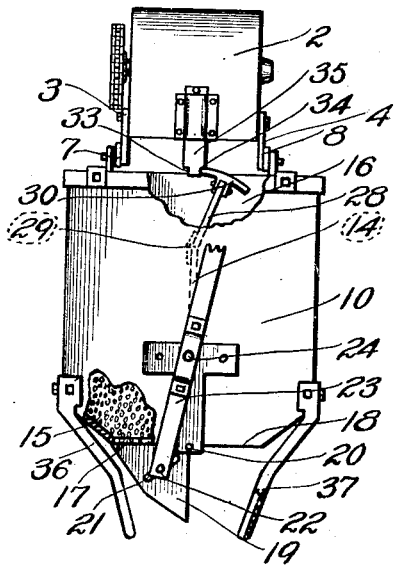
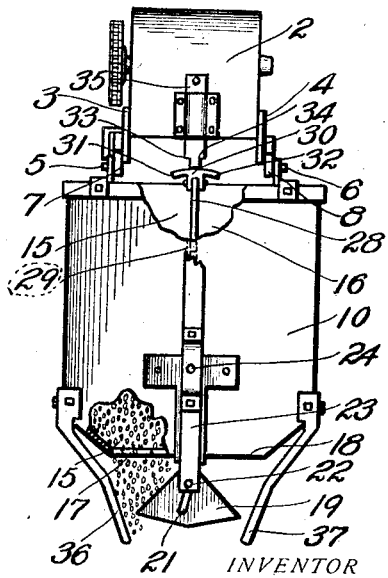
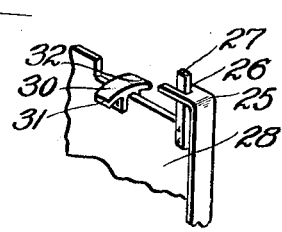
INVENTOR
Fred J. Ashwell
ATTORNEY

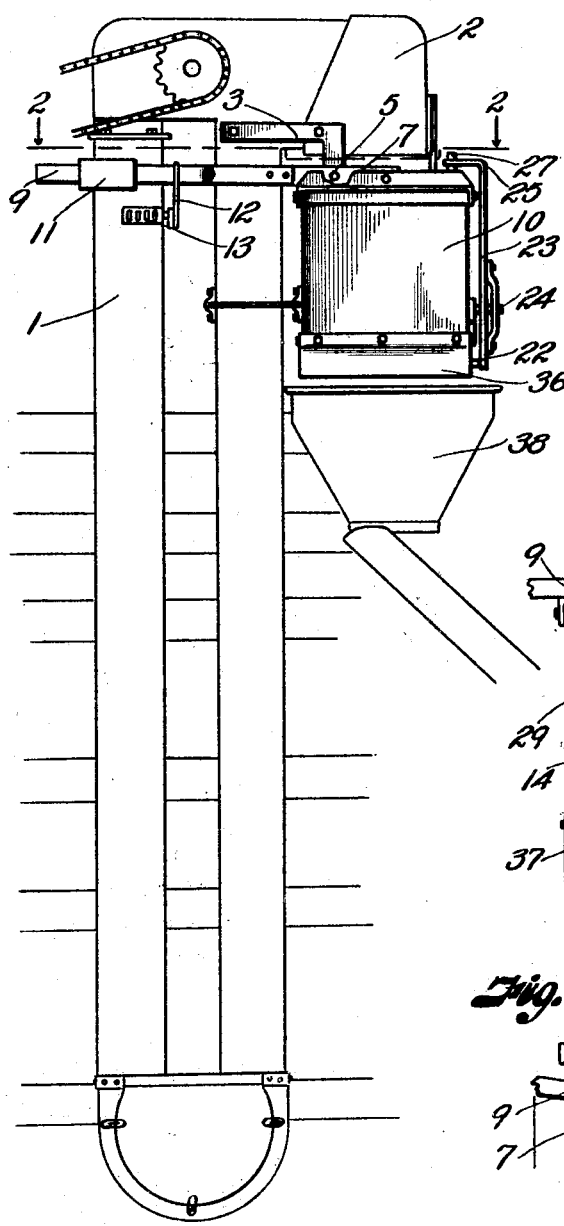
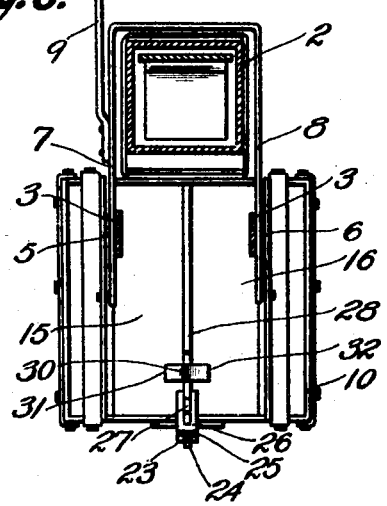
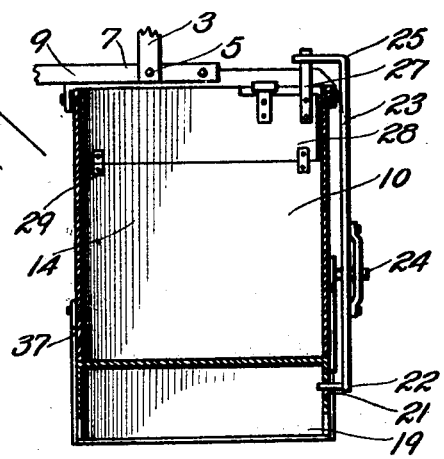
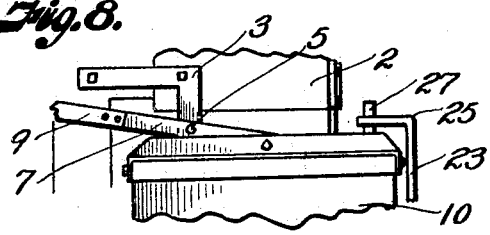

UNITED STATES PATENT OFFICE.

FRED J. ASHWELL, OF KANSAS CITY, MISSOURI, ASSIGNOR OF ONE-HALF TO FORREST L. LANGDON, OF KANSAS CITY, KANSAS.

GRAIN WEIGHER.

1,409,642.  Specification of Letters Patent.  Patented Mar. 14, 1922.

Application filed March 26, 1921. Serial No. 455,717.

*To all whom it may concern:*

Be it known that I, FRED J. ASHWELL, a citizen of the United States, residing at Kansas City, in the county of Jackson and State of Missouri, have invented certain new and useful Improvements in Grain Weighers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to weighing machines and particularly to a novel arrangement of mechanism for continuously weighing grain and the like as it passes from the elevator into a chute or conduit to be distributed to a suitable source.

The invention contemplates a twin compartment weighing hopper so controlled that grain will be alternately fed into the respective compartments and automatically released therefrom in an efficient manner, there preferably being a register for registering the number of weighing operations, from which the amount of grain passing through the weighing mechanism can be deduced.

The novel construction of the preferred form of my invention will be apparent by reference to the following description in connection with the accompanying drawings, in which Fig. 1 is a perspective view of a grain weighing device constructed in accordance with my invention.

Fig. 2 is a front elevational view of the weighing hopper, parts being broken away to show the interior construction thereof, the valve being shown in closing position for one compartment.

Fig. 3 is a similar view with the valve in open position.

Fig. 4 is a detail perspective view of the detent-engaging latch and its supporting wing.

Fig. 5 is a side elevational view of a grain elevator to which my invention is applied.

Fig. 6 is a sectional view on the line 2—2 of Fig. 5.

Fig. 7 is a vertical, longitudinal, sectional view through the hopper, the valve operating mechanism being shown in side elevation, and Fig. 8 is a fragmentary view of part of the hopper and part of the scale beam.

Referring now to the drawings by numerals of reference:

1 designates an elevator of approved construction having a discharge hood or nozzle 2. The hood or upper portion of the elevator 1 is provided with brackets 3 and 4 carrying fulcrum projections 5 and 6, on which are pivotally mounted the arms 7 and 8 of a scale beam 9, said arms being fastened to a hopper 10 which is the weighing element of the scales. The scale beam 9 is provided with a counter-poise 11, which may be operated on the scale beam in the usual way, and depending from the scale beam is a link 12 adapted to operate a register 13 to indicate the number of weighing operations of the scale.

The hopper is divided by a central partition 14 into two chambers or compartments 15 and 16, having discharge openings 17 and 18 at their lower ends adapted to be alternately opened and closed by the valve or gate 19, as clearly seen in Figs. 2 and 3. The gate or valve 19 is pivoted to the hopper 10 at 20.

The gate or valve 19 is provided with a diagonally slotted portion 21, in which a pin 22 works, the pin being carried on a lever 23 pivoted at 24 to the hopper and having an inwardly projecting finger 25 bifurcated at 26 to engage an upstanding finger or projection 27 on the wing 28, pivoted at 29 to the partition 14. The wing 28 supports an arcuate latch plate 30, the opposite ends 31 and 32 of which are adapted to alternately engage the notched portions 33 and 34 of the detent bar 35, carried by the hood 2. The lower end of the hopper is provided with deflectors shown as plates 36 and 37 to direct the grain into the hopper, receiver or similar device 38.

When the parts are assembled and it is desired to weigh the grain, the counter-poise 11 can be set so that determined quantities of grain will be received in the respective compartments 15 and 16 in alternate relation. The grain will be fed from the hood or spout 2 of the conveyor, first to one compartment and then to the other. Assuming that the compartment 15 is being filled, the wing 28, which supports the detent, will deflect the grain from the hood 2 into compartment 15; at the same time, the end 31 of the detent plate 30 will be engaging the notch 34 of the detent 35. Thus the valve 19 will be closing the discharge orifice 17. When the requisite amount of grain has entered the compartment 15 so that the counter-poise 11 is overbalanced, the hopper 10 will be moved downwardly until the end 31 of the detent latch 30 will move out of engagement with the notched portion 34 of the detent 35. The weight of the grain will then be sufficient to swing the valve 19 away from the opening 17 so that the grain can be dumped. The impetus given to the valve 19 will swing the lever 23 beyond a straight line in an opposite direction so that when the grain moves out of the compartment 15, the hopper will begin to rise; in fact, it will begin to rise just as soon as enough grain has moved out of compartment 15 to permit the counter-poise 11 to overbalance it. As it rises, the end 32 will engage the notch 33 of the detent 35 so that the valve 19 will close the opening 18 and the deflecting wing 28 will deflect the grain from the hood 2 into the hopper compartment 16 until it accumulates sufficient grain to cause it to overbalance the counter-poise 11 when the hopper will again move downwardly so that the end 32 will move out of notch 33 and the triangular valve 19 will be swung into closing position for compartment 15. These alternating operations will continue so long as grain is fed into the hopper 10.

Each downward movement of the hopper 10 will cause the link 12 to operate the register 13 so that the number of operations of the hopper may be observed by reference to the register 13 and the requisite computation can be made to determine the amount of grain which has passed through the hopper 10.

From the foregoing it will be apparent that the device will operate automatically to continuously weigh the grain passed from the hood 2 and that, at the end of the weighing operation, the amount of grain may be determined by reference to the register 13.

It will also be observed that the operations may continue without the attention of an operator.

What I claim and desire to secure by Letters-Patent is:

1. A grain weighing device comprising a hopper, a central partition in the hopper dividing the same into two compartments, a pivoted wing carried by the partition, an arcuate detent-engaging lock carried by the wing, a detent having notches on opposite sides to be alternately engaged by the detent-engaging lock, a pivoted valve carried by the bottom of the hopper, and connections between the wing and the valve whereby the valve may swing the wing in alternate directions, the lock on the wing being effective in engaging the detent to hold the valve temporarily in fixed position.

2. A grain weighing device comprising a pivoted scale beam having a counter-poise on one end and a hopper on the other, a partition in the hopper, a detent comprising a notched bar above the hopper, a swinging wing carried by the partition, an arcuate plate on the partition adapted to alternately engage and disengage the respective notches in the detent, a pivoted valve on the bottom of the hopper for opening and closing the compartments, and a connection between the valve and the wing whereby they may move in unison.

3. A grain weighing device comprising a pivoted scale beam having a counter-poise on one end and a hopper on the other, a partition in the hopper, a detent comprising a notched bar above the hopper, a swinging wing carried by the partition, an arcuate weight on the partition adapted to alternately engage and disengage the respective notches in the detent, a pivoted valve on the bottom of the hopper for opening and closing the compartments, and a connection between the valve and the wing whereby they may move in unison, said connection comprising a lever pivoted to the hopper and having a lateral portion at its upper end and engaging a portion on the wing and having a lower portion pivotally engaging the valve.

In testimony whereof I affix my signature.

FRED J. ASHWELL.